US008677346B1

(12) United States Patent
Griffin et al.

(10) Patent No.: US 8,677,346 B1
(45) Date of Patent: Mar. 18, 2014

(54) PROVIDING INSTALLER PACKAGE INFORMATION TO A USER

(75) Inventors: Kent Griffin, Santa Monica, CA (US); Sourabh Satish, Fremont, CA (US); Vijay Seshadri, Milpitas, CA (US); Abubakar Wawda, Los Angeles, CA (US); Jing Zhou, Marina del Rey, CA (US)

(73) Assignee: Symantec Corporation, Mountain View, CA (US)

( * ) Notice: Subject to any disclaimer, the term of this patent is extended or adjusted under 35 U.S.C. 154(b) by 239 days.

(21) Appl. No.: 13/246,794

(22) Filed: Sep. 27, 2011

(51) Int. Cl.
*G06F 9/445* (2006.01)

(52) U.S. Cl.
USPC ............................ 717/174; 717/171; 717/175

(58) Field of Classification Search
USPC ........................... 717/168–177; 709/203–204
See application file for complete search history.

(56) References Cited

U.S. PATENT DOCUMENTS

| 6,266,811 | B1 * | 7/2001 | Nabahi | 717/174 |
|---|---|---|---|---|
| 6,324,693 | B1 * | 11/2001 | Brodersen et al. | 717/177 |
| 6,785,683 | B1 | 8/2004 | Zodik et al. | |
| 6,874,143 | B1 * | 3/2005 | Murray et al. | 717/173 |
| 6,990,660 | B2 * | 1/2006 | Moshir et al. | 717/171 |
| 7,117,495 | B2 * | 10/2006 | Blaser et al. | 717/174 |
| 7,171,662 | B1 * | 1/2007 | Misra et al. | 717/177 |
| 7,210,143 | B2 * | 4/2007 | Or et al. | 717/174 |
| 7,281,245 | B2 * | 10/2007 | Reynar et al. | 717/173 |
| 7,478,237 | B2 | 1/2009 | Costea et al. | |
| 7,797,270 | B2 | 9/2010 | Kester et al. | |
| 7,823,147 | B2 * | 10/2010 | Moshir et al. | 717/173 |
| 7,827,546 | B1 * | 11/2010 | Jones et al. | 717/173 |
| 7,873,960 | B2 * | 1/2011 | Templin et al. | 717/175 |
| 7,900,201 | B1 * | 3/2011 | Qureshi et al. | 717/174 |
| 7,945,957 | B2 | 5/2011 | Dettinger et al. | |

(Continued)

OTHER PUBLICATIONS

Nauman et al, "Apex: Extending Android Permission Model and Enforcement with User-defined Runtime Constraints", ACM, pp. 328-332, 2010.*

(Continued)

*Primary Examiner* — Anil Khatri
(74) *Attorney, Agent, or Firm* — Fenwick & West LLP

(57) ABSTRACT

Installer package information is presented to a user in response to an attempted installation of an application on an endpoint. The attempted installation is detected and the installer package is identified to an information server. The installer package may be identified using a hash key or other unique identifier. In response, the information server provides to the endpoint information associated with the identified installer package based on information received from a plurality of other endpoints. The endpoint may also provide installation and application information related to the installer package to the information server. In one embodiment, when the information server obtains more than the threshold amount of information for an installer package, the information server may analyze the information and provide the analysis to requesting endpoints. The analysis may include the risk or performance impact of the installer package, or the category or functionality of the application.

18 Claims, 5 Drawing Sheets

(56) References Cited

U.S. PATENT DOCUMENTS

| | | | |
|---|---|---|---|
| 8,112,412 B1 | 2/2012 | Nachenberg | |
| 8,135,775 B1 * | 3/2012 | Anderson et al. | 709/203 |
| 8,136,100 B1 * | 3/2012 | Goldman | 717/136 |
| 8,261,246 B1 | 9/2012 | Naroff et al. | |
| 8,266,615 B2 * | 9/2012 | Shapiro | 717/175 |
| 8,332,842 B2 * | 12/2012 | Bauer et al. | 717/174 |
| 8,336,044 B2 * | 12/2012 | Wang et al. | 717/174 |
| 8,352,937 B2 * | 1/2013 | Sanders et al. | 717/178 |
| 8,458,695 B2 * | 6/2013 | Fitzgerald et al. | 718/1 |
| 8,533,704 B2 * | 9/2013 | Wookey | 717/174 |
| 8,578,363 B2 * | 11/2013 | Sah et al. | 717/169 |
| 2004/0153644 A1 | 8/2004 | McCorkendale et al. | |
| 2008/0184371 A1 | 7/2008 | Moskovitch et al. | |
| 2009/0300765 A1 | 12/2009 | Moskovitch et al. | |
| 2011/0167495 A1 | 7/2011 | Antonakakis et al. | |
| 2012/0158626 A1 | 6/2012 | Zhu et al. | |
| 2012/0271941 A1 | 10/2012 | Mirandette et al. | |

OTHER PUBLICATIONS

Suleman et al, "A Flexible Approach to Web Component Packaging", ACM Proceedings of SAICSIT, pp. 257-266, 2006.*

Manna, "Dynamic Software Update for Component-based Distributed Systems", ACM, pp. 1-8, 2011.*

Pukall et al, JavAdaptor: Unrestricted Dynamic Software Updates for Java ACM, pp. 989-991, 2011.*

Moskovitch, R. et al., "Unknown Malcode Detection and the Imbalance Problem," Journal in Computer Virology, 2009, pp. 295-308, vol. 5, No. 4.

* cited by examiner

PROVIDING INSTALLER PACKAGE INFORMATION TO A USER

BACKGROUND

1. Field of Art

The present invention generally relates to the field of software installation and in particular to conveying information about a software application to a user prior to installation.

2. Background of the Invention

When a user downloads a new software application, the application is typically stored in "package" form. Software installer packages are archived into a format ready for installation by the user onto the user's computer system. When a user installs the downloaded application, the application package decompresses the application, installs software components onto the user's computer, and configures the computer to run the application. Often, a user is required to install an application onto the user's computer prior to running the application.

In many instances, a user is unable to fully assess the changes an installer package makes to the user's computer prior to installation. Components installed by an installer package may have varying degrees of stability, and changes made by an installer package may affect computer performance outside of the application. Further, certain software applications may come packaged with malicious software which a user might inadvertently install while installing the downloaded application.

SUMMARY

The above and other issues are addressed by a computer-implemented method, non-transitory computer-readable storage medium, and computer for presenting installer package information to a user of an endpoint. Embodiments of the method comprise detecting an installation of an application on the endpoint. The identity of the installer package associated with the detected installation is provided to an information server. Installer package information is received from the information server, the information server configured to generate the installer package information based on information associated with the identified installer package received from a plurality of endpoints. The received information is then presented to the user prior to the installation of the application.

Embodiments of the non-transitory computer-readable storage medium store executable computer program instructions performing steps for detecting an installation of an application on the endpoint. The identity of the installer package associated with the detected installation is provided to an information server. Installer package information is received from the information server, the information server configured to generate the installer package information based on information associated with the identified installer package received from a plurality of endpoints. The received information is then presented to a user prior to the installation of the application.

Embodiments of the computer comprise a non-transitory computer-readable storage medium storing executable computer program instructions. The instructions perform steps for detecting an installation of an application on the endpoint. The identity of the installer package associated with the detected installation is provided to an information server. Installer package information is received from the information server, the information server configured to generate the installer package information based on information associated with the identified installer package received from a plurality of endpoints. The received information is then presented to a user prior to the installation of the application. The computer additionally comprises a processor for executing the computer program instructions.

DETAILED DESCRIPTION

Figure 1:
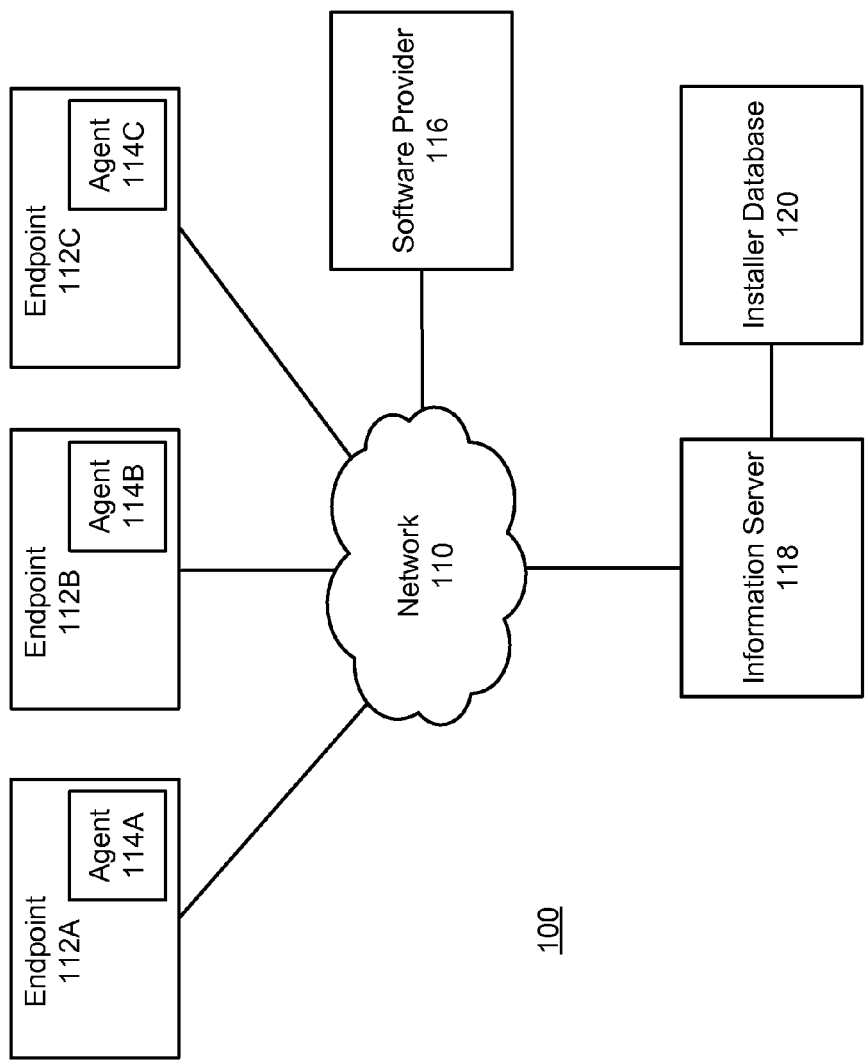
FIG. 1 is a high-level block diagram illustrating an environment for presenting installer package information to a user of an endpoint according to various embodiments.

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. FIG. 1 and the other figures use like reference numerals to identify like elements. A letter after a reference numeral, such as "112A," indicates that the text refers specifically to the element having that particular reference numeral. A reference numeral in the text without a following letter, such as "112," refers to any or all of the elements in the figures bearing that reference numeral (e.g. "112" in the text refers to reference numerals "112A," "112B" and/or "112C" in the figures).

FIG. 1 is a high-level block diagram illustrating an environment 100 for presenting installer package information to a user of an endpoint according to various embodiments. FIG. 1 illustrates a network 110 connecting multiple endpoints 112A, 112B, and 112C to a software provider 116 and an information server 118. The software provider 116 may be any entity capable of providing an application installer package to an endpoint 112. While FIG. 1 shows only three endpoints 112A, 112B, and 112C, one software provider 116, one information server 118, and one installer database 120 for simplicity, embodiments of the environment 100 can have any number of these entities. Other entities may be connected to the network 110 as well.

The network 110 represents communication pathways between entities connected to the network and in one embodiment is the Internet. In one embodiment, the network 110 uses standard communications technologies and/or protocols. Thus, the network 110 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. The data exchanged over the network 110 can be represented using technologies and/or formats including image data in binary form (e.g. Portable Network Graphics (PNG)), the hypertext markup language (HTML), the extensible markup language (XML), etc. In another embodiment, the entities on the network 110 use custom and/or dedicated data communications technologies instead of, or in addition to, the ones described above.

An endpoint 112 is any device capable of allowing a user to install an application, running a monitoring agent 114, and communicating through the network 110. For example, the endpoints 112 may include electronic devices such as computers or smart phones, and may include communicative software such as web browsers. The endpoints 112 run agents 114 configured to monitor installation activity on the endpoints 112. For example, a user of an endpoint 112 may retrieve an application installer package from the software provider 116 via the network 110 and may attempt to install the application. In response, an agent 114 may detect the attempted installation, identify the installer package, and report the attempted installation to the information server 118. In addition, the agents 114 are configured to receive installer information from the information server 118 and display the information to the users of the endpoints 112 prior to the installation of the application. Agents 114 may be part of an operating system installed on an endpoint 112, may be a component of another application installed on an endpoint 112, or may be a standalone application installed on an endpoint 112.

The information server 118 is configured to receive the identity of an installer package from the agents 114 via the network 110 and query the installer database 120 for information related to the installer package. It should be noted that the installer database 120 may be a standalone database, or the functionality of the installer database 120 and the information server 118 may be combined into a single system or module. In the event that the installer database 120 is storing information related to the identified installer, the information server 118 will retrieve and provide the information to the agent 114. The retrieved information may include the components that the identified installer package will install on the endpoint 112 and the changes that the installer package will make to the endpoint 112, and the category or functionality of the application associated with the installer package.

In one embodiment, the information server 118 provides installer information to the agent 114 only if the installer database 120 stores a pre-determined threshold amount of information related to the identified installer. In the event that the installer database 120 does not store a pre-determined threshold of information related to the identified installer, the information server 118 may request installer package information from the monitoring agent 114. In response to receiving such a request, the agent 114 may allow the endpoint 112 to proceed with the installation of the application, and may monitor all changes made to the endpoint 112 by the installer package. These changes include, but are not limited to, components installed, system setting and configuration changes, and the like. Similarly, the agent 114 may identify information related to the application, including but not limited to, the source of the application, application meta information, and the like. The agent 114 may then provide information related to the installation and the application to the information server 118.

Once the information server 118 receives a threshold amount of information for a particular installer package (which the information server 118 stores in the installer database 120), the information server 118 may format the information and identify information common to a threshold number of endpoints 112. In one embodiment, the information server 118 may normalize the information to account for discrepancies between endpoints, operating systems or other endpoint parameters. Based on the installer package information, the information server 118 may determine the risk or performance impact of installing the application as a whole, of installing particular components of the application, or of making particular changes to the endpoint 112. The information server 118 may identify keywords related to the received application information, and may use an ontological mapping which maps keywords to functionalities or categories to determine a functionality or category for the installer package.

The information server 118 may then provide the identified common installation information, the installer package risks and performance impacts, and the application functionality/category information to agents 114 which subsequently query the information server 118 for information related to the installer package. For example, the information provided by the information server 118 may indicate that the installer package installs a particular component, that the component presents little to no risk or performance impact, and that the application provides real-time news updates to the endpoint 112.

It should be noted that the description herein is limited to instances of installation information presented to a user in response to an attempted installation. In alternative embodiments, however, installation information may be presented to a user at the time the application is downloaded, at the time a user is about to download the application, or on an application store, website, or catalog.

Figure 2:
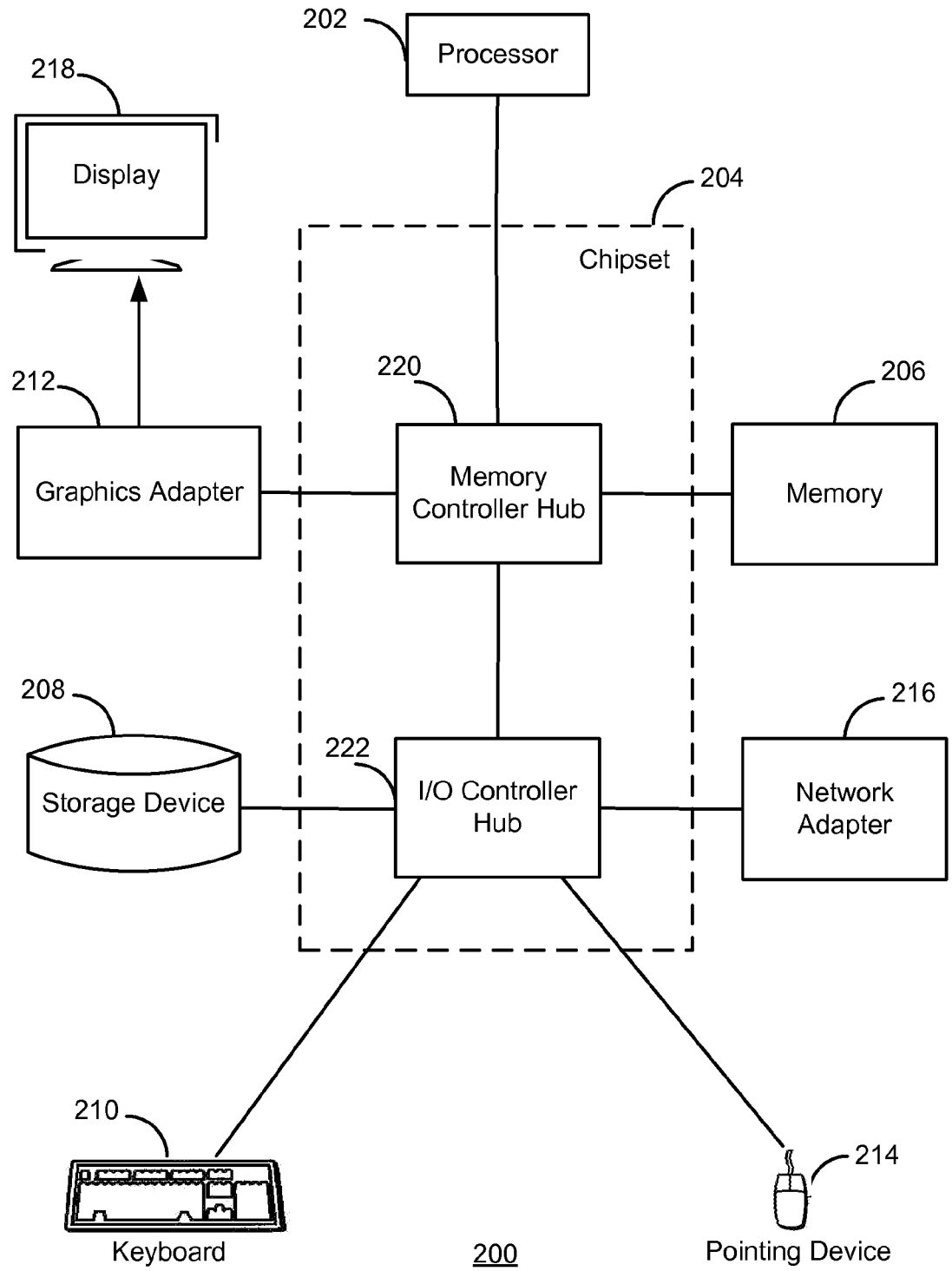
FIG. 2 is a high-level block diagram illustrating an example of a computer for use as the endpoint, the software provider, the information server and/or the installer database according to various embodiments.

FIG. 2 is a high-level block diagram illustrating an example of a computer 200 for use as the endpoints 112, the software provider 116, the information server 118, and/or the installer database 120. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a non-transitory computer-readable storage medium such as a hard drive, compact disk read-only memory (CD-ROM), DVD, solid-state memory device, or a magnetic tape drive. The storage device 208 can also include multiple instances of the media, such as an array of hard drives or a magnetic tape changer in communication with a library of magnetic tapes. The memory 206 holds instructions and data used by the processor 202. The pointing device 214 is used in combination with the keyboard 210 to input data into the computer system 200. The graphics adapter 212 displays images and other information on the display device 218. In some embodiments, the display device 218 includes a touch screen capability for receiving user input and selections. The network adapter 216 couples the computer 200 to the network 110. Some embodiments of the computer 200 have different and/or other components than those shown in FIG. 2. In one example embodiment, the computer 200 is a smartphone, and the pointing device 214 and the display device 218 are integrated into a single touch-screen component.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3:
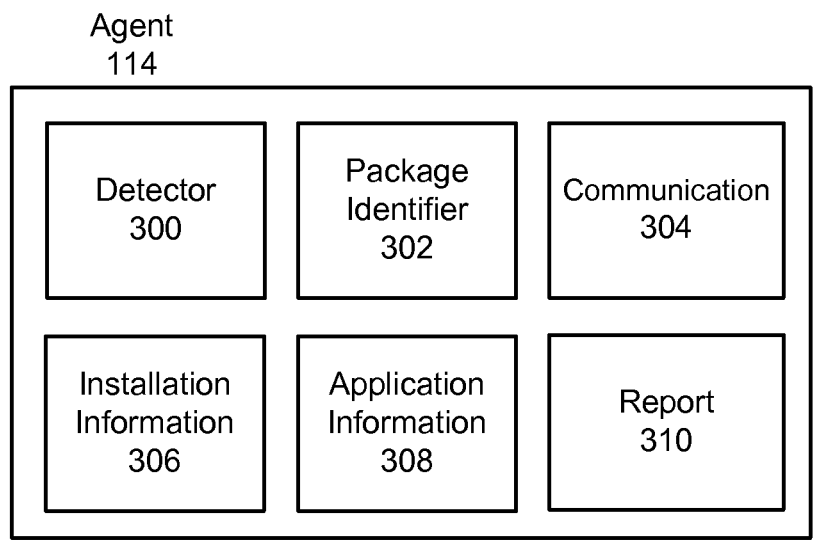
FIG. 3 is a high-level block diagram illustrating a detailed view of the endpoint agent according to one embodiment.

FIG. 3 is a high-level block diagram illustrating a detailed view of the endpoint agent 114 according to one embodiment. As shown in FIG. 3, the agent 114 includes a detector module 300, a package identifier module 302, a communication module 304, an installation information module 306, an application information module 308, and a report module 310. In some embodiments, the functions are distributed among the modules in a different manner than described herein. In addition, some embodiments include different and/or other modules.

The detector module 300 detects an attempted installation of an application onto an endpoint 112. In one embodiment, an attempted installation involves a user of the endpoint 112 downloading an application installer package from a software provider 116 and executing the downloaded installer package. The detector module 300 may detect an attempted installation in a variety of ways. In one embodiment, the detector module 300 uses the Windows Installer software component for the Microsoft WINDOWS™ operating system to determine whether an installer package (often with the extension ".MSI") is executed. Likewise, the detector module 300 may use the Installer application included in Apple's OS X™ operating system to identify an attempted installation. In one embodiment, the detector module 300 suspends or stalls the installation until the user of the endpoint 112 manually approves of the installation, for example, after installation and application information have been displayed to the user.

The detector module 300 may examine the contents of files themselves both before execution (for example, during downloading) and when executed to determine if the files include installers. For example, the detector module 300 may determine that a file named "install.exe" is an installer. Likewise, if a file includes information in the file signature indicating it is an installer, or if the file contains installer properties, the detector module 300 may determine that the file is an installer. Once the detector module 300 identifies one or more files as installers, the detector module 300 monitors these files for execution to detect attempted installations. Alternatively, the detector module 300 may utilize any additional means of detecting the installation of an application on the endpoint 112.

In response to a detected attempted installation by the detector module 300, the package identifier module 302 identifies the installer package associated with the attempted installation. The package identifier module 302 may utilize any unique identifier to identify the installer package. For example, the package identifier module 302 may apply a hash function to the installer package to determine a hash value associated with the installer package. The hash value may be used by the agent 114 to identify the installer package to the information server 118. Alternatively, the package identifier module 302 may identify the installer package by the source of the installer package (such as the URL the installer package was downloaded from), the name of the installer package file, metadata associated with the installer package file, or by any other information related to the installer package file.

The communication module 304 communicates with the information server 118 via the network 110. In response to the detector module 300 detecting an attempted installation and the package identifier module 302 identifying the installation package associated with the attempted installation, the communication module 304 communicates the installation package identity to the information server 118. As will be discussed below, if the information server 118 includes greater than a threshold amount of information associated with the installer package, the communication module 304 may receive installer package information (such as installation information and application information) associated with the identified installation package from the information server 118. This received information may be displayed to the user of an endpoint by the report module 310 prior to the completion of the attempted installation.

The report module 310 may display the received installation and application information on an endpoint display. The displayed information may include any installation information related to the installer package described below, such as any system service the installer package will install, any drivers the installer package will install, any created autostart entries and/or program groups, etc. In addition, the report module 310 may display one or more risks associated with the installation information. For example, installed system services may be assigned a high level of risk, and created program groups may be assigned a low level of risk. These risk assignments may be displayed in conjunction with the installation information. In one embodiment, the report module 310 may display the performance impact installing the application may have on a user's endpoint 112. The risk and/or performance impact may be determined for each component installed or changed made by the installer package individually, or may be determined for the total installer package.

Displaying installation information and (optionally) associated risks and performance impacts beneficially informs the user of exactly what changes are being made to the endpoint 112 prior to the installation of the application, allowing a user to weigh the consequences of installing the application and offering the user the chance to abort the installation if desired. The assessment of risk and/or performance impact associated with installing an application may be made by the information server 118, by the agent 114, a combination of the two, or by any other entity. The assessment of risk and/or performance impact may be made based on pre-determined rules, based on the hardware or software of the endpoint 112, based on the configuration of the endpoint 112, based on the user of the endpoint 112, or based on any other suitable factors. For example, the assessment of risk may be based on known compatibility issues between an application and the hardware of the endpoint 112 or other applications installed on the endpoint 112.

In one embodiment, when the communication module 304 queries the information server 118 for information related to an identified installer package, the communication module 304 includes information related to the endpoint 112 or the user so that the information server 118 may make a risk and/or performance impact assessment tailored to the endpoint 112 or the user. For example, the information server 118 may determine that a user's endpoint 112 may not contain enough memory to effectively run an application. The report module 310 may display this determination to the user of the endpoint 112, and may prompt the user with the choice to proceed with the installation or to abort the installation.

The displayed information may also include one or more application categories or functionalities related to the installer package. For example, an installer package for a weather application may be assigned a "weather" category and an installer package for a document editing application may be assigned a "word processing" functionality. Displaying an application category or functionality to the user allows the user to ensure that the application being installed is the proper application desired by the user. Prior to installation, the user may not be able to verify that a particular application performs the desired functionality. Beneficially, by informing the user of an application's category and/or functionality prior to installation, the user may verify that the application will perform a functionality or in a category as desired, and may abort installation otherwise.

In addition, the report module 310 may display alternative applications to the user prior to installation of a particular application that are in the same category or that perform the same functionality as the particular application. This provides an opportunity to inform the user of related applications that may perform better or that are less risky. The report module 310 may additionally display to a user a link to a website or other portal that can provide a view of related or alternative functionally categorized applications. Likewise, the linked website or portal may provide additional risk information related to the application being installed and to the alternative applications.

Alternatively, the communication module 304 may receive a response from the information server 118 requesting additional installation and application information for the identified installer package. In response to receiving this request, the installation information module 306 may identify the installation activity of the installer package and/or the application information module 308 may identify information related to the application, and the communication module 304 may communicate the identified installation activity and/or the application information to the information server 118.

It should be noted that installation information and application information related an identified installer package may be requested by the information server 118 even in the event that the information server 118 has access to a threshold amount of installer information and application information for the identified installer package. For example, if the information server 118 provides installation and application information to a user of an endpoint 112, and the user proceeds with installation, the information server 118 may request installation and application information in order to expand or update the installer database 120.

The installation information module 306 identifies the installation activity of the identified installer package on an endpoint 112 by allowing an executed installation to proceed and by monitoring the components installed on the endpoint 112 and the other system changes made to the endpoint 112. The installation activity of the installer package identified by the installation information module 306 may include program group creation, driver installation, the updating of files, changes to or the addition of registry settings, the addition of shared components to common folders, services created, application extensions installed, changes to operating system settings, system service installation, daemon installation, autostart entry creation, and portable executable (PE) file creation. Additional installation information may be identified by the installation information module 306. As discussed above, all installation information related to an identified installer package may be transmitted to the information server 118 by the communication module 304.

In one embodiment, the installation information module 306 can identify installation activity without the installation of the application. For example, the installation information module 306 may open an installer package's .MSI file and may extract the components installed and the settings changed by the installer package using the installer database within the .MSI file. This installation information may then be transmitted to the information server 118. It should be noted that installation information extracted from an installer package's .MSI file may be presented to a user of an endpoint 112 by the report module 310 instead of installation information received from the information server 118.

The application information module 308 identifies information related to the application being installed by the identified installer package and transmits this information to the information server 118 via the communications module 310. The application information may include the URL of the identified installer package, which is identified by the application information module 308 when the installer package is downloaded. The application information may also include operating system registry information for the application (such as the Program Group Name for the WINDOWS™ operating system). In addition, the application information may include meta information optionally registered with the operating system, such as application comments, the application display name, included help links or URLs, the operation system location which the application will be installed to, and information stored in the registry key fields "URLInfoAbout" and "URLUpdateInfo". The application information may further include version information embedded in the installer package file properties and "version information" block, such as the file name, the file description, the product name, and the original file name. In addition, the application information module 308 may identify any additional application information related to the identified installer package.

Figure 4:
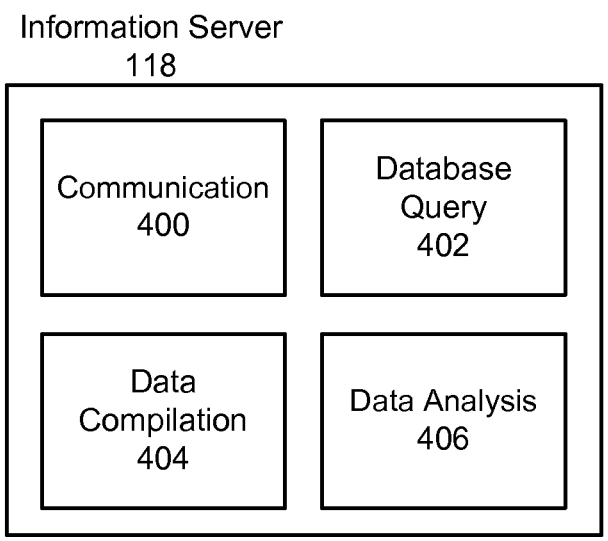
FIG. 4 is a high-level block diagram illustrating a detailed view of the information server according to one embodiment.

FIG. 4 is a high-level block diagram illustrating a detailed view of the information server 118 according to one embodiment. As shown in FIG. 4, the information server 118 includes a communication module 400, a database query module 402, a data compilation module 404, and a data analysis module 406. In some embodiments, the functions are distributed among the modules in a different manner than described herein. In addition, some embodiments include different and/or other modules.

The communication module 400 communicates with the agents 114 of the endpoints 112 via the network 110. The communication module 400 is configured to receive the identity of an installer package from the agent 114. In response to receiving the identity of an installer package, the database query module 402 queries the installer database 120 for information related to the identified installer package. In the event that the installer database 120 contains information related to the identified installer package (such as application information, installation information, risk and performance impact information, and category/functionality information), the database query module 402 retrieves the information and the communication module 400 provides the information to the agent 114.

In the event that the installer database 120 does not contain information related to the identified installer package, or does not contain a pre-determined threshold of information related to the identified installer package, the communication module 400 requests and is configured to receive information related to the identified installer package from the agent 114. The database query module 402 is additionally configured to store information received from the agent 114 to the installer database 120. Information received from the agent 114 and written to the installer database 120 is associated with the received installer package identity. For example, the installer database 120 may store information based on the received installer package identity, such that all information received from multiple agents 114 related to a particular installer package is stored together.

Once a threshold amount of information related to a particular installer package is retrieved and stored in the installer database 120, the data compilation module 404 may format the information, and the data analysis module 406 may analyze the information. The formatted information and the information analysis may be written to the installer database 120 in conjunction with the particular installer package for later retrieval by the information server 118. In one embodiment, until a threshold amount of information is received for a particular installer package, the data compilation module 404 and the data analysis module 406 will not format and analyze the information associated with the particular installer package, respectively. In an alternative embodiment, the data compilation module 404 may format application and installation information as it is received from agents 114, prior to being written to the installer database 120.

The threshold amount of information related to a particular installer package required for formatting and analysis may be pre-determined and may be based on a minimum number of agents 114 from which the information is received. For example, the threshold amount of information related to a particular installer package may be satisfied when information is received from 50 different agents 114. Alternatively, the threshold amount of information related to an installation package required for formatting and analysis may be based on any other suitable criteria.

It should be noted that the threshold amount of information related to a particular installer package may be very minimal. In one embodiment, if the installer database 120 stores any information at all related to the particular installer package, the information may be retrieved by the information server 118 and presented to a user by an agent 114. In one embodiment, the information server 118 provides installer information to a user without regard to an information threshold. In this embodiment, the information server 118, upon receiving an installer package identify from an agent 114, retrieves installer information associated with the identified installer package and provides this information to the agent 114. It should be noted that in such an embodiment, the information server 118 may request additional installer information from the agent 114 after providing stored installer information to the agent 114 in order to update the installer database 120.

The data compilation module 404 is configured to format installation and application information related to installer packages. The installation and application information for a particular installer package may vary from endpoint to endpoint. For example, file names in information received from desktop computers may be different from file names in information received from smartphones. The data compilation module 404 may normalize installation information associated with an installer package based on the hardware or software of the endpoints 112 that the information is received from. In one embodiment, the data compilation module 404 may format the installation information related to an installer package into a uniform format.

The data compilation module 404 may normalize installation information associated with an installer package based on the configuration of the endpoints 112 that the information is received from. In such an embodiment, agents 114 may report very different numbers and types of components installed, registry settings changed, etc., due to (for example) various endpoints 112 missing dependency components or containing different settings. In response, the data compilation module 404 may normalize the installation information accounting for the configuration of the endpoints 112 from which the installation information is received.

The application information received from the agents 114 may be unstructured. For example, the application meta information associated with an installer package may vary based on the operating system of the endpoint 112. As a result, the data compilation module 404 may normalize application information associated with an installer package based on the hardware, software, and configuration of the endpoints 112 from which the information is received, or based on the type of application information. In one embodiment, the data compilation module 404 may format the application information into a uniform format.

The data compilation module 404 may supplement installation and application information with information from another source. In one embodiment, the installation or application information received from agents 114 may be supplemented with application information obtained from running a search for the application name in a search engine. For example, for a weather program, the data compilation module 404 may query a search engine using the name of the weather program and may obtain the application information "weather application", "weather ticker", and the like in response. Likewise, the data compilation module 404 may scan the contents of the website from which an installer package is downloaded in order to supplement received application information.

The data analysis module 406 analyzes installation and application data associated with an installer package. For example, the data analysis module 406 may determine the risk of a particular component installed by an installer package, or may determine that the category of the application associated with the installer package is "baseball statistics". These risk and category determinations may be associated with the installer package and stored in the installer database 120 such that whenever an agent 114 queries the information server 116 for the installer package, the information server 116 can retrieve the determined risk and category of the installer package and can provide this analysis to the agent 114 for presentation to the user of an endpoint 112.

The data analysis module 406 may discard outlier installation data associated with an installer package prior to analyzing the installation information. For example, if greater than a threshold amount of installation information for an installer package indicates that a particular driver is not installed by the installer package, the data analysis module 406 may discard installation information which indicates that the particular driver is installed by the installer package. In one embodiment, the data analysis module 406 discards outlier information by removing it from the installer database 120. Alternatively, the data analysis module 406 may merely ignore outlier data. Such an embodiment has the advantage of allowing the installer database 120 to track outlier data while the installer database 120 continues to gather installation data. In the event that the amount of outlier data stored by the installer database 120 eventually exceeds the threshold, the data analysis module 406 may subsequently analyze the outlier data.

The data analysis module 406 may determine the risk or performance impact associated with the installation information for an installer package in a variety of ways. In one embodiment, the determination of risk or performance impact is based on the type of installation activity associated with the installer package. For example, an installer package that makes changes to registry settings may be determined to be of greater risk than an installer package which creates a startup menu entry. The determination of risk or performance impact may be based on the hardware, software, configuration or user of an endpoint 112. For example, an installer package may be determined to be of greater risk when installed on a computer running the WINDOWS™ operating system than a computer running the OS X™ operating system. Likewise, an installer package may be determined to have a great performance impact on a computer with 1 gigabyte of RAM than a computer with 4 gigabytes of RAM. The data analysis module 406 may determine the risk or performance impact associated with installation information for an installer package by querying a reputation database, such as the Symantec Reputation Database.

The data analysis module 406 may quantify the risk or performance impact of an installer package based on the installation information. In one embodiment, the data analysis module 406 may use a Low/Medium/High scale, which may be based on an overall installer package assessment, or may be based on individual installation activity. For example, the data analysis module 406 may determine than installation an application is a "High Risk" activity, or may determine that individual installation activities of the identified installer package are "High Risk" while others are "Medium Risk" or "Low Risk". Similarly, the data analysis module 406 may use a Low/Medium/High scale to quantify the performance impact of an installer package. Alternatively, other scales or metrics may be used to quantify the risk or performance impact of an installer package. As discussed above, the quantified risk or performance impact of an installer package may be stored in the installer database 120 in association with the installer package.

The data analysis module 406 analyzes application information associated with an installer package to identify words, such as English words or words of another spoken language, within the application information. In one embodiment, the data analysis module 406 scans and parses the application information into English words. For example, the application information may include multiple words combined into a single ngram, such as "WindowsMediaPlayer", and the data analysis module 406 parses the ngram into the individual words "Windows", "Media", and "Player". The data analysis module 406 may analyze all application information associated with an installer package and may create a list of words which appear in the application information. In one embodiment, the data analysis module 406 also includes a count for each word in the list of words indicating how many times each word appeared in the application information.

The data analysis module 406 then selects keywords from the analyzed application information. In one embodiment, the keywords are selected from among the list of words created by the data analysis module 406. The data analysis module 406 may select the most relevant or frequently appearing words as keywords representing the application information for an installer package. Alternatively, the data analysis module 406 may use a bag-of-words algorithm, term frequency models, term frequency-inverse document frequency weightings, or other natural language processing means or algorithms to select keywords from the application information. The data analysis module 406 may discard common words deemed to be of a low value, such as the words "the", "program", "application", "versions", "HKEY_LOCAL_MACHINE", "software", "uninstall", and the like.

The data analysis module 406 queries one or more ontological mappings of keywords to functionalities or categories using the selected keywords for an installer package. In response to querying the ontological mappings, the data analysis module 406 retrieves one or more functionalities or categories associated with an installer package. In one embodiment, the data analysis module 406 retrieves functionalities from the mappings and determines one or more categories based on the retrieved functionalities. The ontological mappings may be created based on previously analyzed installer packages, and may be modified over time using subsequently analyzed installer packages. The data analysis module 406 stores retrieved and determined functionalities and categories for an installer package in the installer database 120 in association with the installer package.

The data analysis module 406 may associate all installer packages with common functionalities or categories in the installer database 120. For example, all installer packages with the "Word Processing" functionality or the "Geography" category may be associated with each other. When the database query module 402 queries the installer database 120 using an identified installer package, the installer database 120 may then return a list of additional applications with common functionalities and/or categories to the identified installer package. These additional applications may be provided to the user of an endpoint 112 prior to the installation of the identified installer package, allowing the user to select an alternative application to download and install instead of the application associated with the identified installer package.

Figure 5:
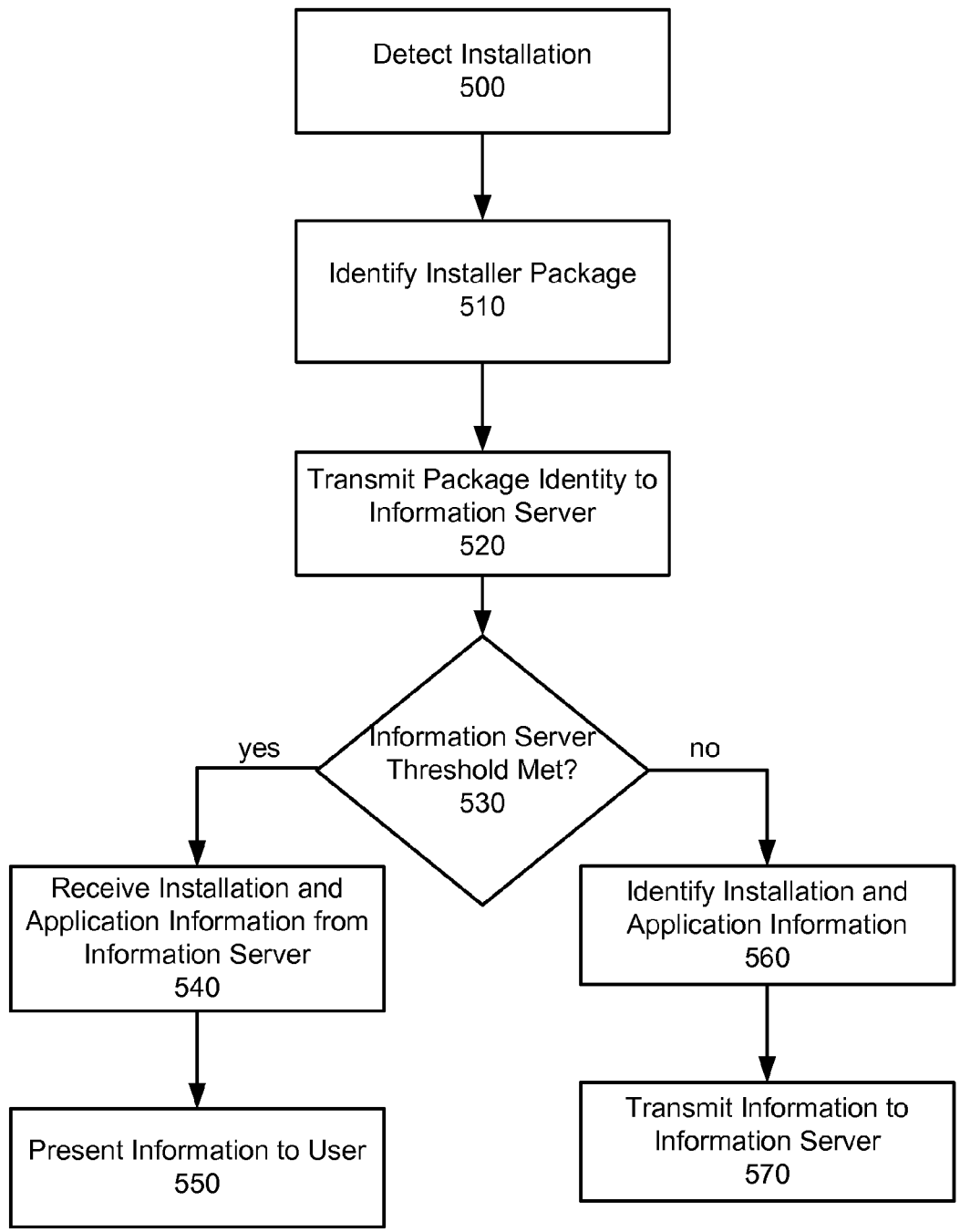
FIG. 5 is a flowchart illustrating a method of presenting installer package information to a user according to one embodiment.

FIG. 5 is a flowchart illustrating a method of presenting installer package information to a user according to one embodiment. Other embodiments can perform the steps in different orders and can include different and/or additional steps. In one embodiment, the method is performed by an endpoint agent 114 installed on an endpoint 112, though in other embodiments, other entities perform this method.

An installation is detected 500 on the endpoint 112. In one embodiment, the Windows Installer is used to detect an installation. The agent 114 may interrupt and pause the installation until additional information is received about the installation. The installer package associated with the detected installation is identified 510, and the identity of the installer package is transmitted 520 to the information server 118. In one embodiment, the installer package is identified using a hash function to produce a hash key. Alternatively, other means of uniquely identifying the installer package may be used.

If the amount of information about the identified installer package stored at the information server 118 exceeds 530 a threshold, the agent 114 may receive 540 installation and application information from the information server and present 550 the information to the user of the endpoint 112. In one embodiment, the installation information includes the components installed and the changes made by the identified installer package. In addition, the installation information may include an assessment of the risk and/or performance impact of the identified installer package. In one embodiment, the application information includes one or more functionalities and/or categorizations of the application associated with the identified installer package. In addition, the application information may include similar applications with common functionalities and/or categorizations. Presenting this information to the user allows the user to make an informed decision as to whether or not to proceed with the attempted installation. As discussed above, the installer package information threshold may be minimal. Alternatively, the agent 114 may receive 540 installer package information from the information server without regard to an installer package information threshold.

If the amount of information about the identified installer package stored at the information server 118 does not exceed 530 a threshold, the agent 114 may identify 560 the installation activity of the identified installer package and information related to the application being installed. In one embodiment, the agent 114 identifies installation information by allowing the attempted installation to proceed and monitoring the changes made to the endpoint 112 by the installer package. In one embodiment, the agent 114 identifies application information by analyzing the source of the identified installer package, identifying the parameters related to the installer package, and identifying the changes made to the endpoint 112 by the installer package. The identified installation and application information is transmitted 570 to the information server 118. Alternatively, the agent 114 may identify 560 the installation activity of the identified installer package and information related to the application being installed, and may transmit this information to the information server without regard to an installer package information threshold.

Figure 6:
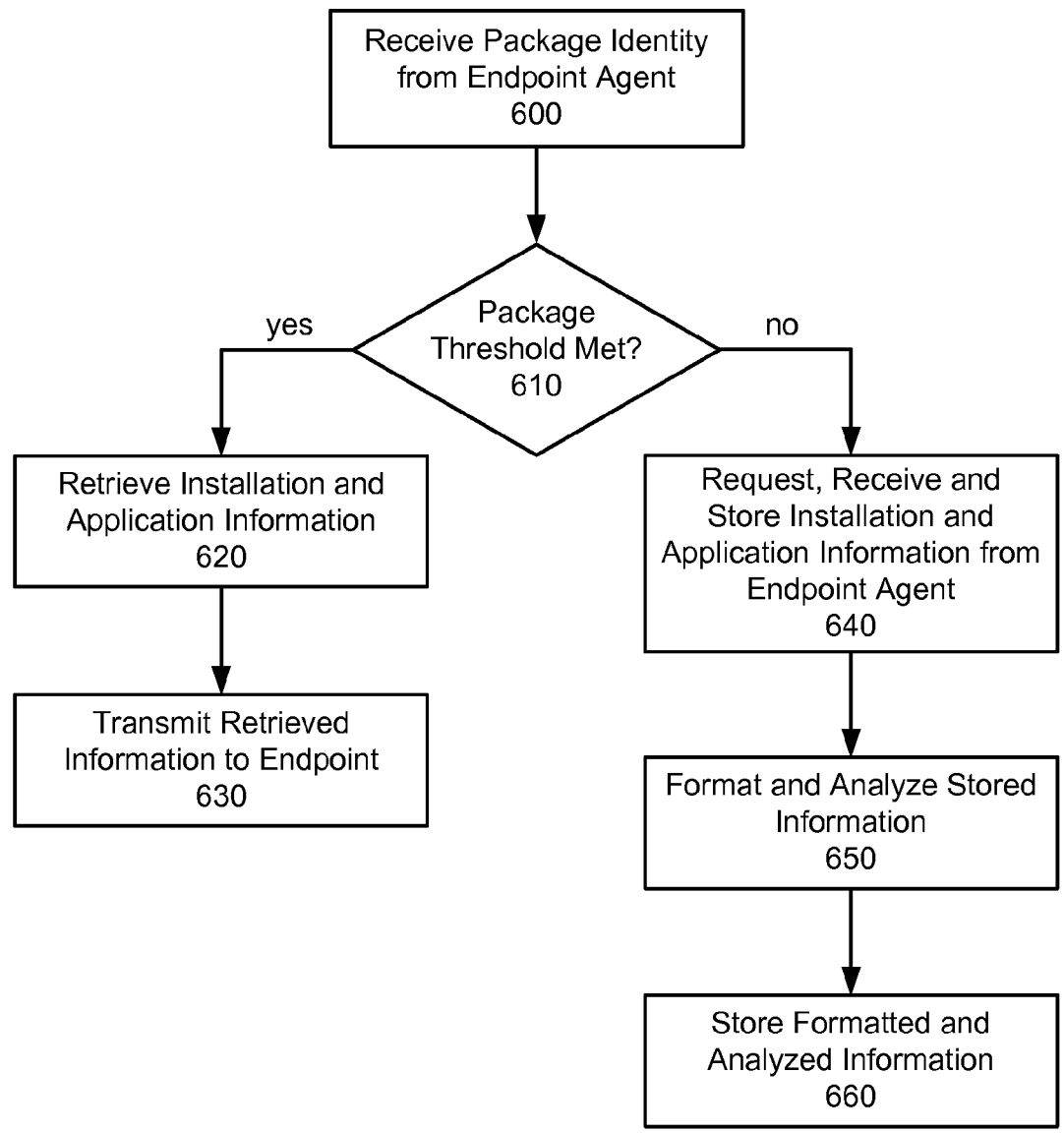
FIG. 6 is a flowchart illustrating a method of providing installer package information to an endpoint according to one embodiment.

FIG. 6 is a flowchart illustrating a method of providing installer package information to an endpoint according to one embodiment. Other embodiments can perform the steps in different orders and can include different and/or additional steps. In one embodiment, the method is performed by an information server 118, though in other embodiments, other entities perform this method.

The identity of an installer package is received 600 from an endpoint agent 114. If the amount of information about the identified installer stored at the information server 118 exceeds 610 a threshold, installation and application information related to the identified installer is retrieved 620 and transmitted 630 to the endpoint agent 114. As discussed above, this retrieved information may additionally include risk and performance impact assessments and application functionalities and categorizations. In one embodiment, all information about the identified installer stored at the information server 118 is retrieved 620 and transmitted 630 to the endpoint agent 114, without regard to a information threshold.

If the amount of information about the identified installer stored at the information server 118 does not exceed 610 a threshold, installation and application information related to the identified installer package is requested, received and stored 640 from the endpoint agent 114. The received information is stored at the information server 118, for instance at the installer database 120. When the amount of information about a particular installer package stored at the information server 118 exceeds the threshold, the information about the particular package is formatted and analyzed 650. In one embodiment, formatting the stored information includes normalizing the information into a uniform format. In one embodiment, analyzing the stored information includes determining the risk or performance impact of one or more of the components installed and/or changes made by the installer package. Likewise, analyzing the stored information may include identifying keywords in the application information and determining one or more functionalities or categories related to the application using one or more ontological mappings. The formatted and analyzed information is stored 660 at the information server 118, for instance at the installer database 120. In one embodiment, installation and application information is requested, received and stored 640 from an endpoint agent 114 without regard to an information threshold.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of presenting installer package information to a user, comprising:
   detecting, by an endpoint, an installation attempt of an application onto the endpoint, the attempted installation associated with an installer package;
   in response to detecting the installation attempt, providing an identity of the installer package to an information server;
   receiving installer package information from the information server, wherein the information server is configured to generate generates the installer package information based on information associated with the identified installer package received from a plurality of other endpoints if the information server stores more than a threshold of information associated with the identified installer package; and
   presenting, by the endpoint, the received installer package information to the user prior to the installation of the application.

2. The method of claim 1, wherein the received installer package information comprises information associated with at least one of:
   components installed by the installer package, changes made to the endpoint by the installer package, a risk associated with the installer package, a performance impact associated with the installer package, an application category, an application functionality, and related applications.

3. The method of claim 1, further comprising:
   providing information associated with the identified installer package to the information server, wherein the information server is configured to incorporate the provided information into installer package information supplied to other endpoints.

4. The method of claim 3, wherein identifying installer package information associated with the identified installer package comprises:
   monitoring the endpoint during installation; and
   identifying changes made to the endpoint by the installer package during the monitored installation.

5. The method of claim 3, wherein the information server is configured to receive installer package information associated with the identified installer package from the plurality of other endpoints, to analyze the received installer package information, and to store the analysis.

6. The method of claim 5, wherein analyzing the received installer package information comprises at least one of: identifying a risk associated with the installer package, identifying a performance impact associated with the installer package, identifying an application category and/or functionality associated with the installer package, and identifying applications related to the application associated with the installer package.

7. The method of claim 6, wherein identifying an application category and/or functionality associated with the installer package further comprises:
   identifying keywords associated with the received installer package information; and
   querying an ontological mapping with the identified keywords to identify an application category and/or functionality, wherein the ontological mapping maps keywords to categories and/or functionalities.

8. The method of claim 7, wherein the information server is configured to normalize the received installer package information into a uniform format and discard outlier received installer package information.

9. A non-transitory computer-readable storage medium storing executable computer program instructions for presenting installer package information to a user, the instructions performing steps comprising:

detecting, by an endpoint, an installation attempt of an application onto an the endpoint, the attempted installation associated with an installer package;

in response to detecting the installation attempt, providing an the identity of the installer package to an information server;

receiving installer package information from the information server, wherein the information server is configured to generate the installer package information based on information associated with the identified installer package received from a plurality of other endpoints if the information server stores more than a threshold of information associated with the identified installer package; and presenting, by the endpoint, the received installer package information to the user prior to the installation of the application.

10. The computer-readable medium of claim 9, wherein the received installer package information comprises information associated with at least one of:

components installed by the installer package, changes made to the endpoint by the installer package, a risk associated with the installer package, a performance impact associated with the installer package, an application category, an application functionality, and related applications.

11. The computer-readable medium of claim 9, the instructions further performing steps comprising:

providing information associated with the identified installer package to the information server, wherein the information server is configured to incorporate the provided information into installer package information supplied to other endpoints.

12. The computer-readable medium of claim 11, wherein identifying installer package information associated with the identified installer package comprises:

monitoring the endpoint during installation; and
identifying changes made to the endpoint by the installer package during the monitored installation.

13. The computer-readable medium of claim 11, wherein the information server is configured to receive installer package information associated with the identified installer package from the plurality of other endpoints, to analyze the received installer package information, and to store the analysis.

14. The computer-readable medium of claim 13, wherein analyzing the received installer package information comprises at least one of: identifying a risk associated with the installer package, identifying a performance impact associated with the installer package, identifying an application category and/or functionality associated with the installer package, and identifying applications related to the application associated with the installer package.

15. The computer-readable medium of claim 14, wherein identifying an application category and/or functionality associated with the installer package further comprises:

identifying keywords associated with the received installer package information; and querying an ontological mapping with the identified keywords to identify an application category and/or functionality, wherein the ontological mapping maps keywords to categories and/or functionalities.

16. The computer-readable medium of claim 13, wherein the information server is configured to normalize the receive installer package information into a uniform format and discard outlier received installer package information.

17. An endpoint for presenting installer package information to a user, the endpoint comprising:

a non-transitory computer-readable storage medium storing executable computer program instructions for performing steps comprising:

detecting, by the endpoint, an installation attempt of an application onto the endpoint, the attempted installation associated with an installer package;

in response to detecting the installation attempt, providing an identity of the installer package to an information server;

receiving installer package information from the information server, wherein the information server is configured to generate the installer package information based on information associated with the identified installer package received from a plurality of other endpoints if the information server stores more than a threshold of information associated with the identified installer package; and presenting, by the endpoint, the received installer package information to the user prior to the installation of the application; and a processor for executing the computer program instructions.

18. The endpoint of claim 17, wherein the computer program instructions are further for perform steps comprising:

providing information associated with the identified installer package to the information server, wherein the information server is configured to incorporate the provided information into installer package information supplied to other endpoints.

\* \* \* \* \*

UNITED STATES PATENT AND TRADEMARK OFFICE
CERTIFICATE OF CORRECTION

| | | |
|---|---|---|
| PATENT NO. | : 8,677,346 B1 | Page 1 of 1 |
| APPLICATION NO. | : 13/246794 | |
| DATED | : March 18, 2014 | |
| INVENTOR(S) | : Griffin et al. | |

It is certified that error appears in the above-identified patent and that said Letters Patent is hereby corrected as shown below:

In the Claims,

Column 14, line 6, after "to generate", delete "generates".
Column 15, line 5, after "an", delete "the".
Column 16, line 43, replace "are further for perform steps comprising" with "for performing further steps comprising".

Signed and Sealed this
Thirtieth Day of December, 2014

Michelle K. Lee
*Deputy Director of the United States Patent and Trademark Office*